United States Patent
Fukushima et al.

(10) Patent No.: US 8,389,048 B2
(45) Date of Patent: *Mar. 5, 2013

(54) MAGNETIC RECORDING MEDIUM, METHOD FOR PRODUCTION THEREOF AND MAGNETIC RECORDING AND REPRODUCING DEVICE

(75) Inventors: Masato Fukushima, Ichihara (JP); Akira Sakawaki, Ichihara (JP); Yasumasa Sasaki, Tokyo (JP)

(73) Assignee: Showa Denko K.K., Tokyo (JP)

( * ) Notice: Subject to any disclaimer, the term of this patent is extended or adjusted under 35 U.S.C. 154(b) by 962 days.

This patent is subject to a terminal disclaimer.

(21) Appl. No.: 12/278,914
(22) PCT Filed: Feb. 6, 2007
(86) PCT No.: PCT/JP2007/052446
§ 371 (c)(1), (2), (4) Date: Dec. 22, 2008
(87) PCT Pub. No.: WO2007/091702
PCT Pub. Date: Aug. 16, 2007

(65) Prior Publication Data
US 2009/0323219 A1    Dec. 31, 2009

Related U.S. Application Data

(60) Provisional application No. 60/773,338, filed on Feb. 15, 2006.

(30) Foreign Application Priority Data

Feb. 10, 2006 (JP) .................. 2006-034218
Feb. 14, 2006 (JP) .................. 2006-036957
Mar. 7, 2006 (JP) .................. 2006-061493
Apr. 25, 2006 (JP) .................. 2006-120741

(51) Int. Cl.
*G11B 5/187* (2006.01)
(52) U.S. Cl. ................................. 427/131
(58) Field of Classification Search ............ 427/130, 427/131
See application file for complete search history.

(56) References Cited

U.S. PATENT DOCUMENTS

| 4,030,942 A | 6/1977 | Keenan et al. |
| 4,451,500 A | 5/1984 | Gerard et al. |

(Continued)

FOREIGN PATENT DOCUMENTS

| CN | 1143246 A | 2/1997 |
| EP | 0 671 726 A2 | 9/1995 |

(Continued)

OTHER PUBLICATIONS

Ahn et al., "Fabrication of subwavelength aluminum wire grating using nanoimprint lithography and reactive ion etching", Jan. 2005, Microelectronic Engineering, pp. 314-318.

(Continued)

*Primary Examiner* — Michael Cleveland
*Assistant Examiner* — Tabassom Tadayyon Eslami
(74) *Attorney, Agent, or Firm* — Sughrue Mion, PLLC

(57) ABSTRACT

A method for the production of a magnetic recording medium (30) includes the steps of depositing a magnetic layer or Co-containing magnetic layer (3) on at least one side of a nonmagnetic substrate (1) and partially implanting atoms into the magnetic layer or Co-containing magnetic layer to partially unmagnetize the magnetic layer or Co-containing magnetic layer, thereby forming nonmagnetic parts (4) and a magnetic recording pattern magnetically separated by the nonmagnetic parts and, in the case of the Co-containing magnetic layer, lowering Co (002) or Co (110) peak strength of a relevant part of the Co-containing magnetic layer as determined by the X-ray diffraction to ½ or less. A magnetic recording and reproducing device includes the magnetic recording medium (30), a driving part (26) for driving the magnetic recording medium in a direction of recording, a magnetic head (27) consisting of a recording part and a regenerating part, means (28) for moving the magnetic head relative to the magnetic recording medium, and recording and reproducing signal processing means (29) adapted to enter a signal into the magnetic head and regenerate an output signal from the magnetic head.

5 Claims, 1 Drawing Sheet

U.S. PATENT DOCUMENTS

| | | | |
|---|---|---|---|
| 4,460,412 A | | 7/1984 | Imura et al. |
| 4,476,152 A | | 10/1984 | Imura et al. |
| 4,584,668 A | | 4/1986 | Takeuchi et al. |
| 4,642,270 A | * | 2/1987 | Morita et al. .............. 428/621 |
| 4,701,385 A | | 10/1987 | Imura et al. |
| 4,772,976 A | | 9/1988 | Otomo et al. |
| 5,599,590 A | | 2/1997 | Hayashi et al. |
| 5,991,104 A | | 11/1999 | Bonyhard |
| 6,086,961 A | | 7/2000 | Bonyhard |
| 6,331,364 B1 | | 12/2001 | Baglin et al. |
| 6,383,574 B1 | | 5/2002 | Han et al. |
| 6,400,492 B1 | | 6/2002 | Morita et al. |
| 6,434,096 B1 | | 8/2002 | Akagi et al. |
| 6,480,447 B1 | | 11/2002 | Wakabayashi et al. |
| 6,565,929 B2 | | 5/2003 | Gurovich et al. |
| 6,753,043 B1 | * | 6/2004 | Kuo et al. .............. 427/526 |
| 6,753,130 B1 | | 6/2004 | Liu et al. |
| 6,864,042 B1 | | 3/2005 | Kuo et al. |
| 7,067,207 B2 | | 6/2006 | Kamata et al. |
| 7,147,790 B2 | | 12/2006 | Wachenschwanz et al. |
| 7,521,135 B2 | | 4/2009 | Morikawa et al. |
| 7,549,209 B2 | | 6/2009 | Wachenschwanz et al. |
| 7,820,064 B2 | | 10/2010 | Jin |
| 8,048,323 B2 | | 11/2011 | Fukushima et al. |
| 8,158,215 B2 | * | 4/2012 | Fukushima et al. .......... 427/523 |
| 2002/0005888 A1 | | 1/2002 | Obata et al. |
| 2002/0048225 A1 | | 4/2002 | Shinoda |
| 2002/0122959 A1 | | 9/2002 | Matsunuma et al. |
| 2002/0142163 A1 | | 10/2002 | Mino et al. |
| 2002/0142192 A1 | | 10/2002 | Kamata et al. |
| 2003/0180576 A1 | | 9/2003 | Nakamura et al. |
| 2003/0193735 A1 | | 10/2003 | Kuo et al. |
| 2004/0091748 A1 | | 5/2004 | Kamata et al. |
| 2004/0101713 A1 | | 5/2004 | Wachenschwanz et al. |
| 2004/0191557 A1 | | 9/2004 | Kamata et al. |
| 2004/0258833 A1 | | 12/2004 | Kamata et al. |
| 2005/0036223 A1 | | 2/2005 | Wachenschwanz et al. |
| 2005/0069732 A1 | | 3/2005 | Kamata et al. |
| 2005/0170212 A1 | | 8/2005 | Albrecht et al. |
| 2005/0191525 A1 | | 9/2005 | Tsumori et al. |
| 2005/0220991 A1 | | 10/2005 | Aoyama et al. |
| 2006/0141141 A1 | | 6/2006 | Kamata et al. |
| 2006/0203368 A1 | | 9/2006 | Kaizu et al. |
| 2007/0039922 A1 | | 2/2007 | Wachenschwanz et al. |
| 2007/0041306 A1 | | 2/2007 | Wachenschwanz et al. |
| 2007/0190328 A1 | | 8/2007 | Cowburn et al. |
| 2008/0293170 A1 | | 11/2008 | Miyata et al. |
| 2009/0180213 A1 | | 7/2009 | Fukushima et al. |
| 2009/0237838 A1 | | 9/2009 | Fukushima et al. |
| 2009/0323219 A1 | | 12/2009 | Fukushima et al. |
| 2010/0020434 A1 | | 1/2010 | Sakawalo et al. |
| 2010/0053797 A1 | | 3/2010 | Fukushima et al. |
| 2010/0053813 A1 | | 3/2010 | Fukushima et al. |
| 2010/0104852 A1 | | 4/2010 | Fletcher et al. |

FOREIGN PATENT DOCUMENTS

| | | | |
|---|---|---|---|
| JP | 62-162326 A | | 7/1987 |
| JP | 05/205257 | * | 8/1993 |
| JP | 07-141641 A | | 6/1995 |
| JP | 9-219020 A | | 8/1997 |
| JP | 2000-200463 A | | 7/2000 |
| JP | 2000-251289 A | | 9/2000 |
| JP | 2001-134929 A | | 5/2001 |
| JP | 2001-229559 A | | 8/2001 |
| JP | 2001-250217 A | | 9/2001 |
| JP | 2002-288813 A | | 10/2002 |
| JP | 2002-359138 A | | 12/2002 |
| JP | 2003-203332 A | | 7/2003 |
| JP | 2004-164692 A | | 6/2004 |
| JP | 2004-178793 A | | 6/2004 |
| JP | 2004-178794 A | | 6/2004 |
| JP | 2004-272982 A | | 9/2004 |
| JP | 2005/108347 A | | 4/2005 |
| JP | 2005-158095 A | | 6/2005 |
| JP | 2005-228913 A | | 8/2005 |
| JP | 2005-293633 A | | 10/2005 |
| JP | 2006-099948 A | | 4/2006 |
| JP | 2006-164365 A | | 6/2006 |
| JP | 2006-260741 A | | 9/2006 |
| JP | 2007-273067 A | | 10/2007 |
| TW | 200529203 | | 2/1994 |
| TW | 455866 B | | 9/2001 |
| TW | 494391 B | | 7/2002 |
| TW | 561462 B | | 11/2003 |
| TW | 248062 B | | 1/2006 |

OTHER PUBLICATIONS

Suharyadi, E. et al., "Fabrication of Patterned Co/Pd Nanostructures Using E-Beam Lithography and Ga Ion-Irradiation", IEICE Technical Report, 2006, pp. 21-26, MR2005-55 (Feb. 2006).

* cited by examiner

MAGNETIC RECORDING MEDIUM, METHOD FOR PRODUCTION THEREOF AND MAGNETIC RECORDING AND REPRODUCING DEVICE

CROSS REFERENCE TO RELATED APPLICATIONS

This application is an application filed under 35 U.S.C. §111(a) claiming the benefit pursuant to 35 U.S.C. §119(e)(1) of the filing dates of Provisional Application No. 60/773,338 filed Feb. 15, 2006 and Japanese Patent Applications No. 2006-03218 filed Feb. 10, 2006, No. 2006-036957 filed Feb. 14, 2006, No. 2006-061493 filed Mar. 7, 2006 and No. 2006-120741 filed Apr. 25, 2006 pursuant to 35 U.S.C. §111(b).

TECHNICAL FIELD

This invention relates to a magnetic recording medium for use as in a hard disk drive, a method for the production thereof, and a magnetic recording and reproducing device.

BACKGROUND ART

In recent years, as magnetic recording devices, such as magnetic disk drives, flexible disk drives and magnetic tape drives, have immensely expanded their ranges of utility and gained in significance, efforts have been directed toward enabling the magnetic recording media used in these drives to be prominently improved in recording density. Particularly, the increase in surface recording density has been further growing in ardency since the introduction of the Magnet-Resistive (MR) head and the Partial Response Maximum Likelihood (PRML) technique. Owing to the further introduction of the Giant-Magnet Resistive (GMR) head and the Tunneling Magneto Resistive (TMR) head in recent years, the increase is continuing at a pace of about 100% per year. These magnetic recording media are being urged to attain a still higher recording density in future and their magnetic recording layers to accomplish addition to coercive force, Signal to Noise Ratio (SNR) and resolution. Recent years have been witnessing efforts that are being continued with the object of enhancing the linear recording density and adding to the surface recording density by increasing the track density as well.

In the latest magnetic recording devices, the track density has reached 110 kTPI. As the track density is further increased, it tends to entail such problems as causing interference between the parts of data magnetically recorded in adjacent tracks and inducing the magnetization transition region in the borderline region to constitute a noise source and impair the SNR. This fact hinders the enhancement of the recording density because it immediately results in lowering the bit error rate.

For the sake of increasing the surface recording density, it is necessary that the individual recording bits on the magnetic recording medium be formed in as minute a size as possible and enabled to secure as large saturated magnetization and magnetic film thickness as permissible. As the recording bits further decrease in size, however, they tend to entail such problems as lessening the minimum volume of magnetization per bit and inducing extinction of recorded data through the magnetization reversal caused by thermal fluctuation.

Further, since the track pitch grows small, the magnetic recording device necessitates a tracking servo mechanism of extremely high accuracy and, at the same time, generally needs adoption of the method of executing the recording in a large width and executing the reproducing in a smaller width than during the recording with a view to eliminating the influence from the adjacent tracks to the fullest possible extent. Notwithstanding that this method is capable of suppressing the influence between the adjacent tracks to a minimum, it entails such problems as rendering sufficient acquisition of the output of reproduction difficult and consequently incurring difficulty in securing a sufficient SNR.

As one means to cope with the problem of thermal fluctuation and accomplish acquisition of due SNR or a sufficient output, an attempt to enhance the track density by forming irregularities along the tracks on the surface of the recording medium and consequently physically separating mutually the adjacent tracks is now under way. This technique will be referred to as a "discrete track method" and the magnetic recording medium that is produced by this technique will be referred to as a "discrete track medium" herein below.

As one example of the discrete track medium, a magnetic recording medium that is formed on a nonmagnetic substrate bestowed on the surface thereof with irregular patterns and enabled to acquire physically separated magnetic recording track and servo signal pattern has been known (refer, for example, to JP-A 2004-164692).

This magnetic recording medium has a ferromagnetic layer formed on the surface of a substrate possessing a plurality of irregularities on the surface thereof via a soft magnetic layer and has a protecting film formed on the surface of the ferromagnetic layer. This magnetic recording medium has formed in the convexed regions thereof magnetic recording regions magnetically divided from the environments.

According to this magnetic recording medium, it is held that a high-density magnetic recording medium issuing no great noise can be formed because the fact that the occurrence of magnetic walls in a soft magnetic layer can be suppressed results in preventing the influence of thermal fluctuation from readily appearing and allowing extinction of interference between the adjacent signals.

The discrete track method is known in two kinds, i.e. a method which forms a track subsequent to forming a magnetic recording medium consisting of a number of stacked thin films and a method which forms a thin-film magnetic recording medium either directly on the surface of a substrate or subsequent to forming irregular patterns on a thin-film layer ready for the formation of a track (refer, for example, to JP-A 2004-178793 and JP-A 2004-178794). The former method, often called a magnetic layer processing type, is at a disadvantage in suffering the medium to be readily contaminated during the course of production and greatly complicating the process of production as well because it requires the physical processing of surfaces to be carried out subsequent to the formation of the medium. The latter method, often called an emboss processing type, though not inducing ready contamination during the course of production, is at a disadvantage in disabling stabilization of the posture and the height of floatation of the recording and reproducing head adapted to execute recording and reproducing while floating on the medium because the irregular shape formed on the substrate is fated to continue existence on the film to be formed.

The emboss processing-type method of production enables no easy realization of a flat surface because the irregular shape formed on the substrate is overlaid with the magnetic layer and the protecting layer and is consequently suffered to continue the existence thereof to the surface to be completed.

On the other hand, the discrete track-type recording medium by the magnetic layer processing-type method adopts a procedure of forming the magnetic layer used for recording on the surface of the substrate and subsequently forming a magnetic pattern and, therefore, acquires a structure that results from executing pattern formation by the imprinting method utilized as for semiconductors, subsequently dry-etching the part fated to form a nonmagnetic part, thereafter embedding SiO$_2$ or a carbon-based nonmagnetic material, subjecting the resultant surface to a planarizing treatment, further coating the surface with a protecting film layer, and forming a lubricating layer thereon. This magnetic etching-type discrete track medium complicates the process of production and not only forms a cause for contamination but also fails to realize a flat surface.

Generally, the magnetic recording medium of such a structure as this enables enlarging the output and input signals through the head and heightening the recording density as well because the distance from the head to the magnetic layer decreases in accordance as the protecting film layer becomes thin. The pit density in the track is decided by the height of floatation of the head running on the surface of the protecting film layer of an irregular shape. How the floatation of the head is stably retained, therefore, constitutes an important task for the sake of accomplishing a high recording density. It is therefore required that the irregular pattern is capable of allowing the floatation of the head to be stably retained, enabling the head to approximate as closely to the magnetic layer as possible, and moreover preventing mutual interference of signals on the adjacent tracks.

However, a technique for producing a discrete track medium that entails scarcely the risk of causing contamination during the course of production and enables formation of a flat surface or a technique for producing a magnetic recording medium that eliminates the phenomenon of blurring of letter during the course of writing of data in magnetic tracks has not been proposed to date.

This invention, in the magnetic recording device confronting technical difficulty in consequence of an increase in recording density, is aimed at eliminating the phenomenon of blurring of letter during the course of magnetic recording and consequently adding to the surface recording density by ensuring retention of a recording and reproducing property better than before, substantially increasing recording density, and decreasing the coercive force and the remanent magnetization in the regions scattered in the magnetic recording pattern part to an extremity. This invention is enabled, particularly by depriving the discrete track-type magnetic recording medium resulting from forming concaves and convexes subsequent to depositing a magnetic layer on a substrate of a step of removing the magnetic layer as compared with the conventional magnetic layer processing procedure, to provide a method of production that simplifies the process of production noticeably and entails no appreciable risk of inducing contamination and a magnetic recording medium that manifests an excellent head floating property and proves to be useful.

DISCLOSURE OF THE INVENTION

The present invention provides as the first aspect thereof a method for the production of a magnetic recording medium comprising the steps of depositing a magnetic layer on at least one side of a nonmagnetic substrate and partially implanting atoms into the magnetic layer to partially unmagnetize the magnetic layer, thereby forming nonmagnetic parts and a magnetic recording pattern magnetically separated by the nonmagnetic parts.

The present invention further provides as the second aspect thereof a method for the production of a magnetic recording medium comprising the steps of depositing a Co-containing magnetic layer on at least one side of a nonmagnetic substrate and partially implanting atoms into the Co-containing magnetic layer to partially unmagnetize the Co-containing magnetic layer, thereby forming nonmagnetic parts and a magnetic recording pattern magnetically separated by the nonmagnetic parts and lowering Co (002) or Co (110) peak strength of a relevant part of the Co-containing magnetic layer as determined by the X-ray diffraction to ½ or less.

The present invention further provides as the third aspect thereof a method for the production of a magnetic recording medium comprising the steps of depositing a magnetic layer on at least one side of a nonmagnetic substrate and partially implanting atoms into the magnetic layer to partially unmagnetize the magnetic layer, thereby forming nonmagnetic parts and a magnetic recording pattern magnetically separated by the nonmagnetic parts and rendering a relevant part of the magnetic layer amorphous.

In the fourth aspect of the invention that includes the method of any one of the first to third aspects, the magnetically separated magnetic recording pattern comprises magnetic recording tracks and servo signal patterns.

In the fifth aspect of the invention that includes the method of any one of the first to fourth aspects, the atoms to be implanted are atoms of any one element selected magnetically from the group consisting of B, P, Si, F, N, H, C, In, Bi, Kr, Ar, Xe, W, As, Ge, Mo and Sn.

In the sixth aspect of the invention that includes the method of any one of the first to fourth aspects, the atoms to be implanted are Kr or Si atoms.

The seventh aspect of the invention that includes the method of any one of the first to sixth aspects further comprises the step of forming a protecting film layer on the magnetic layer, which step is taken before the step of implanting the atoms.

The present invention further provides as the eighth aspect thereof a magnetic recording medium comprising a nonmagnetic substrate, a magnetic layer deposited on at least one side of the nonmagnetic substrate and atoms partially implanted into the magnetic layer to partially unmagnetize the magnetic layer, thereby forming nonmagnetic parts and a magnetic recording pattern magnetically separated by the nonmagnetic parts.

The present invention further provides as the ninth aspect thereof a magnetic recording medium comprising a nonmagnetic substrate, a Co-containing magnetic layer deposited on at least one side of the nonmagnetic substrate and atoms partially implanted into the magnetic layer to partially unmagnetize the magnetic layer, thereby forming nonmagnetic parts and a magnetic recording pattern magnetically separated by the nonmagnetic parts and lowering Co (002) or Co (110) peak strength of a relevant part of the magnetic layer as determined by the X-ray diffraction to ½ or less.

The present invention further provides as the tenth aspect thereof a magnetic recording medium comprising a nonmagnetic substrate, a magnetic layer deposited on at least one side of the nonmagnetic substrate and atoms partially implanted into the magnetic layer to partially unmagnetize the magnetic layer, thereby forming nonmagnetic parts and a magnetic recording pattern magnetically separated by the nonmagnetic parts and rendering a relevant part of the magnetic layer amorphous.

In the eleventh aspect of the invention that includes the magnetic recording medium of any one of the eighth to tenth aspects, the magnetic recording pattern is a perpendicular magnetic recording pattern.

In the twelfth aspect of the invention that includes the magnetic recording medium of any one of the eighth to eleventh aspects, the magnetic recording medium has surface roughness RA satisfying 0.1 nm≦Ra≦2.0 nm.

The present invention further provides as the thirteenth aspect thereof a magnetic recording and reproducing device comprising in combination the magnetic recording medium of any one of the eighth to twelfth aspects, a driving part for driving the magnetic recording medium in a direction of recording, a magnetic head consisting of a recording part and a regenerating part, means for moving the magnetic head relative to the magnetic recording medium, and recording and reproducing signal processing means adapted to enter a signal into the magnetic head and regenerate an output signal from the magnetic head.

This invention, in a magnetic recording medium requiring formation of a magnetic recording pattern subsequent to depositing a magnetic layer on a nonmagnetic substrate, enables provision of a magnetic recording medium that ensures retention of the stability of head floatation, possesses an excellent ability to separate a magnetic recording pattern, avoids succumbing to the influence of signal interference between the adjacent pattern parts and excels in a high recording density property. It further contributes greatly to the enhancement of the productivity because it is capable of omitting the dry etching step aimed at removing a magnetic layer of a magnetic layer processing-type magnetic recording medium that has heretofore been reputed to involve a very complicated step of production.

The magnetic recording and reproducing device that is obtained by this invention excels in high recording density property because it utilizes the magnetic recording medium of this invention and, therefore, excels in head-floating property, manifests an excellent ability to separate a magnetic recording pattern and avoids succumbing to the influence of signal interference between the adjacent pattern parts.

The above and other objects, characteristic features and advantages of the present invention will become apparent to those skilled in the art from the description to be given herein below with reference to the accompanying drawings.

BEST MODE FOR CARRYING OUT THE INVENTION

The present invention relates to a magnetic recording medium furnished on at least one side of a nonmagnetic substrate with a magnetically separated magnetic recording pattern, wherein a nonmagnetic part magnetically separating a magnetic recording pattern part is produced by implanting atoms into a magnetic layer deposited in advance on the nonmagnetic substrate. According to the method for producing the magnetic recording medium of this invention, in magnetically separating a magnetic recording pattern part, no step of physically separating the magnetic recording pattern as by dry etching or stamping is involved unlike a conventional method of production.

The term "magnetic recording pattern" as used in this invention embraces the so-called patterned media having magnetic recording patterns arrayed with definite regularity for each bit, the media having magnetic recording patterns disposed like tracks, and the servo signal patterns as well.

The present invention applies the magnetically separated magnetic recording pattern particularly advantageously among other patterns cited above to the so-called discrete-type magnetic recording medium comprising magnetic recording tracks and servo signal patterns in terms of convenience of manufacture.

This invention will be specifically described below by reference to a discrete-type magnetic recording medium as an example.

Figure 1:
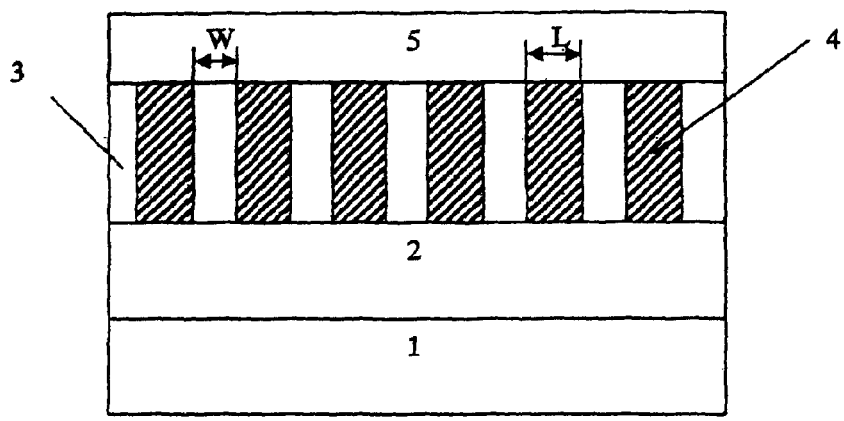
FIG. 1 is a cross section showing the structure of a magnetic recording medium of this invention.

FIG. 1 illustrates the cross-sectional structure of a discrete-type magnetic recording medium of this invention. A magnetic recording medium 30 is configured by forming on the first surface of a nonmagnetic substrate 1 a soft magnetic layer and an intermediate layer 2, a magnetic layer 3 having a magnetic pattern formed thereon, an unmagnetized layer 4, and a protecting layer 5 and further forming on the uppermost surface a lubricating film omitted from illustration.

For the purpose of heightening the recording density, the magnetic layer 3 possessing a magnetic pattern prefers to have a magnetic part width W of 200 nm or less and a nonmagnetic part width L of 100 nm or less. The track pitch P (=W+L), therefore, is decreased to the fullest possible extent in the range of 300 nm or less with the object of heightening the recording density.

The nonmagnetic substrate 1 to be used for this invention may be any of such nonmagnetic substrates, such as Al alloy substrates using an Al—Mg alloy having Al as a main component and substrates formed of ordinary soda glass, aluminosilicate-based glass, glass ceramics, silicon, titanium, ceramics and various kinds of resins. Among other nonmagnetic substrates cited above, an Al alloy substrate, a glass substrate formed of glass ceramic or a silicon substrate is preferably used. The average surface roughness (Ra) of the substrate is 1 m or less, preferably 0.5 nm or less, and particularly preferably 0.1 nm or less.

Though the magnetic layer 3 to be formed on the first surface of the nonmagnetic substrate 1 of such quality as described above is allowed to be either an in-plane magnetic recording layer or a perpendicular magnetic recording layer, it prefers to be a perpendicular magnetic recording layer for the purpose of realizing high recording density. This magnetic recording layer prefers to be formed of an alloy having Co as a main component.

The magnetic recording layer for use in the in-plane magnetic recording medium, for example, may utilize a stacked structure consisting of a nonmagnetic CrMo under layer and a ferromagnetic CoCrPtTa magnetic layer.

The magnetic recording layer for use in the perpendicular magnetic recording medium may utilize a stacked structure that consists of a backing layer formed of a soft magnetic FeCo alloy (FeCoB, FeCoSiB, FeCoZr, FeCoZrB, FeCoZrBCu or the like), FeTa alloy (FeTaN, FeTaC or the like) or Co alloy (CoTaZr, CoZrNB, CoB or the like), an orientation controlling film formed of Pt, Pd, NiCr, NiFeCr or the like, optionally an intermediate film formed of Ru, for example, and a magnetic layer formed of a 60Co-15Cr-15Pt alloy or a 70Co-5Cr-15Pt-10SiO$_2$ alloy.

The thickness of the magnetic recording layer is 3 nm or more and 20 nm or less and preferably 5 nm or more and 15 nm or less. The magnetic recording layer needs only to be so formed as to produce sufficient head input and output in conformity with the kind of magnetic alloy to be used and the stacked structure. The magnetic layer is required to possess a film thickness exceeding a certain degree with the object of obtaining an output exceeding a prescribed degree during the course of regeneration On the other hand, the film thickness must be set at an optimum because the various parameters that represent the recording and reproducing property are generally degraded in accordance as the output is increased.

Generally, the magnetic recording layer is formed as a thin film by the sputtering method.

The protecting film layer 5 is formed on the first surface of the magnetic recording layer 3. For the protecting film layer, protecting film layer materials, such as carbonaceous layers of carbon (C), hydrogenated carbon ($H_xC$), carbon nitride (CN), amorphous carbon, silicon carbide (SiC) or the like, and $SiO_2$, $Zr_2O_3$, TiN or the like which are in popular use are available. The protecting film layer may be formed of two or more component layers.

The film thickness of the protecting film layer 5 must be less than 10 nm. This is because the distance between the head and the magnetic layer will be so large as to prevent acquisition of input and output signals of sufficient intensity if the film thickness of the protecting film layer exceeds 10 nm. Generally, the protecting film layer is formed by the sputtering method or the CVD method.

The protecting film layer 5 prefers to have a lubricating layer formed thereon. As concrete examples of the lubricant that is used for the lubricating layer, fluorine-based lubricants, hydrocarbon-based lubricants, and mixtures thereof may be cited. Generally, the lubricating layer is formed in a thickness of 1 to 4 nm.

Now, the method for producing the magnetic recording medium of this invention will be specifically described below by reference to a discrete-type magnetic recording medium as an example.

The process for producing a magnetic recording medium is generally begun by cleaning and drying a substrate. This invention prefers to perform this cleaning and drying prior to forming a magnetic film layer from the viewpoint of ensuring fast adherence of the component layers. The substrate does not need to restrict the size thereof.

This invention has a soft magnetic layer of FeCoB, an intermediate layer of Ru, a magnetic layer of a 70Co-5Cr-15Pt-10$SiO_2$ alloy and a protecting layer of carbon deposited on the first surface of this substrate. Thereafter, the first surface of the protecting layer is coated with a resist and is made to form magnetically separated magnetic recording tracks and servo signal patterns by the technique of photolithography via the coating of the resist. When atoms are implanted into the resultant surface by using the ion beam method, for example, the atoms are enabled to enter the parts intervening between the magnetic recording tracks and the servo signal patterns.

In the present invention, the discrete track-type magnetic recording medium is produced by causing a nonmagnetic part aimed at magnetically separating the magnetic recording tracks and the servo signal pattern parts to be formed by unmagnetizing a magnetic layer deposited in advance by the implantation of atoms in the magnetic layer. By producing the discrete track-type magnetic recording medium using this method, it is made possible to degrade the coercive force and the remanent magnetization in the regions intervening between the magnetic tracks to extremity and consequently eliminate the phenomenon of blurring of letter during the course of magnetic recording and permit provision of a magnetic recording medium of high surface recording density.

Also in the present invention, a nonmagnetic part aimed at magnetically separating the magnetic recording tracks and the servo signal pattern parts is formed by implanting atoms into a Co-containing magnetic layer deposited in advance, thereby lowering the Co (002) or Co (110) peak strength of the magnetic layer determined by the X-ray diffraction to ½ or less.

The Co (002) peak of the magnetic layer constitutes a main peak in the perpendicular magnetic layer and the Co (110) peak a main peak in the in-plane magnetic layer. The term Co (002) peak in the perpendicular magnetic layer, for example, refers to a peak that originates in Co (002) appearing in the neighborhood of $2\theta=42.6$ degrees in the X-ray diffraction.

By producing the discrete track-type magnetic recording medium using this method, it is made possible to degrade the coercive force and the remanent magnetization in the regions intervening between the magnetic tracks to extremity and consequently eliminate the phenomenon of blurring of letter during the course of magnetic recording and permit provision of a magnetic recording medium of high surface recording density.

Further, in the present invention, a nonmagnetic part aimed at magnetically separating the magnetic recording tracks and the servo signal pattern parts is formed by implanting atoms into a magnetic layer deposited in advance, thereby making the magnetic layer amorphous.

The expression "making the magnetic layer amorphous" as used in the present invention refers to the impartation of an irregular mode destitute of long-distance order to the arrangement of atoms of the magnetic layer. To be more specific, it refers to the state in which microcrystalline grains falling short of 2 nm in diameter are randomly arranged. In the case of confirming this state of arrangement of atoms, the state examined by the X-ray diffraction or the electron diffraction is expected not to show any discernible peak representing a crystal face but to show only a discernible hallow.

By producing the discrete track-type magnetic recording medium using this method, it is made possible to degrade the coercive force and the remanent magnetization in the regions intervening between the magnetic tracks to extremity and consequently eliminate the phenomenon of blurring of letter during the course of magnetic recording and permit provision of a magnetic recording medium of high surface recording density.

In the present invention, as the atoms to be implanted by using the ion beam method, for example, preferably any one or more atoms selected from the group consisting of B, P, Si, F, N, H, C, In, Bi, Kr, Ar, Xe, W, As, Ge, Mo and Sn, more preferably any one or more atoms selected from the group consisting of B, P, Si, F, N, H and C or any one or more atoms selected from the group consisting of Si, In, Ge, Bi, Kr, Xe and W, and most preferably Si or Kr atoms are used. When O or N atoms are used for the implantation as described in the fourth mentioned prior art reference, the implantation only brings an effect so small that the state of magnetization may inevitably persist in the regions intervening between the magnetic tracks because the O or N atom has a small radius. When the O or N atoms are used for the implantation, the coercive force is heightened in the regions intervening between the magnetic tracks and the writing of data in the magnetic track parts is suffered to entail the phenomenon of blurring of letter because these atoms nitride or oxidize the magnetic layer. That is, the use of these atoms, unlike the atoms used for the implantation in the present invention, is incapable of unmagnetizing the magnetic layer, degrading the Co (002) or Co (110) peak of the magnetic layer or rendering the magnetic layer amorphous.

The present invention produces the magnetic recording medium by driving tracks into a magnetic layer, forming a magnetic pattern designed in conformity with the distances between the tracks, then removing the resist and re-forming a protecting layer and thereafter applying a lubricant as a coating.

The present invention prefers to implement the implantation of atoms into the magnetic layer subsequent to forming a protecting film on the magnetic layer. The adoption of this procedure results in obviating the necessity of forming the protecting film subsequent to the implantation of atoms, expediting the process of production and bringing such effects as enhancing productivity and diminishing contamination during the course of production of a magnetic recording medium. Incidentally, the present invention allows, even subsequent to the formation of the magnetic layer or even prior to the formation of the protecting film, to implement the implantation of atoms and effect the formation of the non-magnetic part aimed at magnetically separating the magnetic recording tracks and the servo signal pattern parts.

The implantation of Si atoms, for example, via the ion beam into the magnetic layer is executed by using a commercially available ion implanter. This invention, in implanting the atoms, contemplates directing the implantation of atoms to the neighborhood of the central part in the direction of depth of the magnetic layer and enabling the atoms to be distributed to a certain degree in the direction of depth of the magnetic layer. This invention does not need to limit the depth of implantation particularly because the atoms are implanted into the magnetic layer with the object of unmagnetizing the relevant part of the magnetic layer. The depth of implantation of atoms is decided at a proper time in connection with the depth to be actually reached by the implantation, depending on the accelerated voltage generated by the ion implanter.

Further, in the formation of a pattern subsequent to the application of the resist as a coating, it is by placing a stamper in direct contact with the protecting film produced subsequent to the substrate or the magnetic layer and exerting high pressure on the stamper that concaves and convexes shaped into tracks are formed on the first surface of the protecting layer. This pattern of concaves and convexes may be otherwise formed by the use of a thermosetting resin, a UV setting resin or the like.

As the stamper to be used in the process, what is obtained by forming a fine track pattern on a metallic plate, for example, by the method of electron beam lithography can be used. The material of the stamper is required to possess hardness and durability capable of withstanding the impact of process. While Ni, for example, can be used as the material, the kind of material is irrelevant so long as the object mentioned above is satisfied. On the stamper, patterns of servo signals, such as a burst pattern, a gray cord pattern and a preamble pattern, are formed besides the tracks for recording ordinary data.

During the removal of the resist, the resist on the surface and part of the protecting layer are removed using a technique, such as dry etching, reactive ion etching or ion milling. In consequence of this treatment, the magnetic layer having a magnetic pattern formed thereon and part of the protecting layer are allowed to remain. By selecting the relevant conditions, it is made possible to effect removal as far as the protecting layer and allow persistence of only the magnetic layer having a pattern formed thereon.

For the formation of the component layers of the magnetic recording medium excepting the protecting film layer 3, the RF sputtering method and the DC sputtering method which are popularly used as means to deposit a coating are usable.

For the formation of the protecting film layer, the method of depositing a thin film of Diamond Like Carbon by the method of P-CVD, for example, is popularly employed, though not exclusively.

Figure 2:
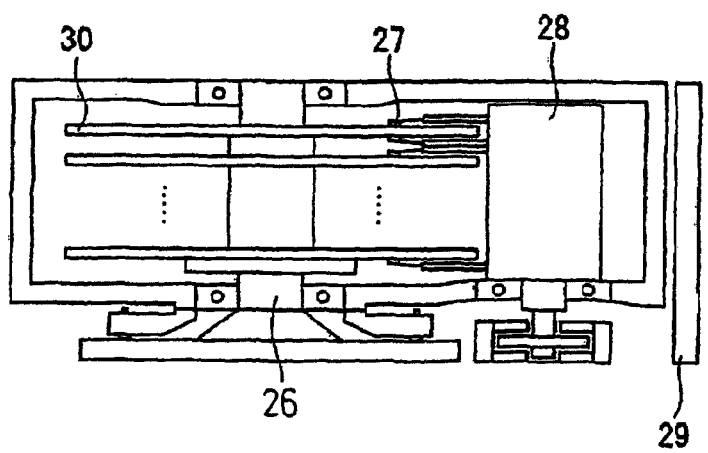
FIG. 2 is an explanatory view showing the structure of a magnetic recording and reproducing device of this invention.

The structure of the magnetic recording and reproducing device of this invention is shown in FIG. 2. The magnetic recording and reproducing device of this invention comprises the magnetic recording medium 30 of this invention, a medium-driving part 26 for driving the medium in the direction of recording, a magnetic head 27 consisting of a recording part and a regenerating part, a head-driving part 28 for imparting motion to the magnetic head 27 relative to the magnetic recording medium 30 and a recording and regenerating signal system 29 incorporating therein a recording and regenerating signal processing means adapted to enter a signal into the magnetic head 27 and regenerate an output signal from the magnetic head 27. The combination of these components enables configuration of a magnetic recording device possessing high recording density. By having the recording tracks of the magnetic recording medium subjected to a magnetically discontinuous processing, it is made possible for the regenerating head and the recording head to be operated in nearly the same width, whereas the practice of giving the regenerating head a smaller width than the recording head in coping with the elimination of the influence of the magnetization transition regions of the track edge parts has prevailed hitherto. It consequently becomes possible to acquire ample regeneration output and a high SNR.

By further having the regenerating part of the magnetic head formed of a GMR head or a TMR head, it is made possible to obtain ample signal strength even at a high recording density and materialize a magnetic recording device possessing a high recording density. By enabling the amount of floatation of this magnetic head to fall in the range of 0.005 μm to 0.020 μm, i.e. a magnitude smaller than ever, it is made possible to enhance the output, acquire a high device SNR and provide a magnetic recording device of a large capacity and high reliability. By incorporating in the combination a signal processing circuit operated by the maximum likelihood decoding method, it is made possible to enhance further the recording density. A sufficient SNR is obtained, for example, even when a recording and reproducing operation is performed at a track density of 100 k tacks/inch or more, a linear recording density of 1000 k bits/inch or more and a recording density of 100 G bits per square inch or more.

Comparative Example 1

A vacuum chamber in which an HD-oriented glass substrate was set was evacuated in advance to a vacuum of $1.0 \times 10^{-5}$ Pa or less. The glass substrate used herein had as the material thereof a glass ceramic that was composed of $Li_2Si_2O_5$, $Al_2O_3$—$K_2O$, $Al_2O_3$—$K_2O$, $MgO$—$P_2O_5$ and $Sb_2O_3$—$ZnO$. It measured 65 mm in outside diameter and 20 mm in inside diameter and had an average surface roughness (Ra) of 2 Å.

On the glass substrate, an $SiO_2$ film was deposited as a pre-emboss layer in a thickness of 200 nm by using the ordinary RF sputtering method.

Next, an imprint was imparted by using a stamper of Ni prepared in advance. The stamper thus prepared was of a type having a track pitch of 100 nm. The grooves were invariably formed in a depth adjusted to 20 nm. The imprint was produced with a relevant stamper.

Subsequently, the $SiO_2$ layer was etched by means of ion beam etching. The thin part of the $SiO_2$ layer was removed by the etching to a depth reaching the substrate, with the result that a pattern of concaves and convexes conforming to the concaves and convexes formed by the stamper was formed on the first surface of the substrate.

On the first surface of the substrate, a soft magnetic layer of FeCoB, an intermediate layer of Ru and a magnetic layer of an 70Co-5Cr-15Pt-10SiO$_2$ alloy were stacked by the DC sputtering method and a protecting film layer of C (carbon) and a fluorine-based lubricating film were further stacked by the P-CVD method, sequentially in the order mentioned. The FeCoB soft magnetic layer had a film thickness of 600 Å, the Ru intermediate layer 100 Å, the magnetic layer 150 Å, and the C (carbon) protecting film layer an average of 4 nm respectively. This sample was produced as an example of the product of emboss processing of Comparative Example 1.

Comparative Example 2

A vacuum chamber in which an HD-oriented glass substrate was set was evacuated in advance to a vacuum of $1.0 \times 10^{-5}$ Pa or less. The glass substrate used herein had as the material thereof a glass ceramic that was composed of $Li_2Si_2O_5$, $Al_2O_3$—$K_2O$, $Al_2O_3$—$K_2O$, MgO—$P_2O_5$ and $Sb_2O_3$—ZnO. It measured 65 mm in outside diameter and 20 mm in inside diameter and had an average surface roughness (Ra) of 2 Å.

On the glass substrate, a soft magnetic layer of FeCoB, an intermediate layer of Ru, and a magnetic layer of a 70Co-5Cr-15Pt-10SiO$_2$ alloy were stacked by the DC spluttering method and a protecting film layer of C (carbon) and a fluorine-based lubricating film were further stacked by the P-CVD method, sequentially in the order mentioned. The FeCoB soft magnetic layer had a film thickness of 600 Å, the Ru intermediate layer 100 Å, the magnetic layer 150 Å and the C (carbon) protecting film layer an average of 4 nm respectively. Thereafter, a magnetic pattern was formed by a magnetic layer processing treatment. Specifically, a resist of a thermosetting resin was applied as a coating to form concaves and convexes in conformity with a prescribed pattern, the magnetic layer in the concave parts was removed by ion milling in the vacuum chamber, and carbon was deposited with the object of embedding the part of the magnetic layer from which the resist on the remaining convexes had been peeled and removed. Thereafter, a film of carbon 4 nm in thickness was deposited by the P-CVD method to implement application of a lubricating material. The resultant surface was planarized by means of ion beam etching. The sample was placed in the vacuum chamber evacuated in advance to a vacuum of $1 \times 10^{-4}$ Pa and Ar gas was introduced into the chamber till a partial pressure of 5 Pa. The sample surface was etched by applying an RF voltage of 300 W to the sample. This sample was produced as an example of the product of magnetic layer processing of Comparative Example 2.

In the embedding process, a nonmagnetic material was used as the material for embedding. In the manufacture of the present sample, SiO$_2$ was used. The technique of sputtering was used for the deposition of the film.

Examples 1 to 26

Similarly to Comparative Example 2, a vacuum chamber in which an HD-oriented glass substrate was set was evacuated in advance to a vacuum of $1.0 \times 10^{-5}$ Pa or less. The glass substrate used herein had as the material thereof a glass ceramic that was composed of $Li_2Si_2O_5$, $Al_2O_3$—$K_2O$, MgO—$P_2O_5$ and $Sb_2O_3$—ZnO. It measured 65 mm in outside diameter and 20 mm in inside diameter and had an average surface roughness (Ra) of 2 Å.

Figure 3:
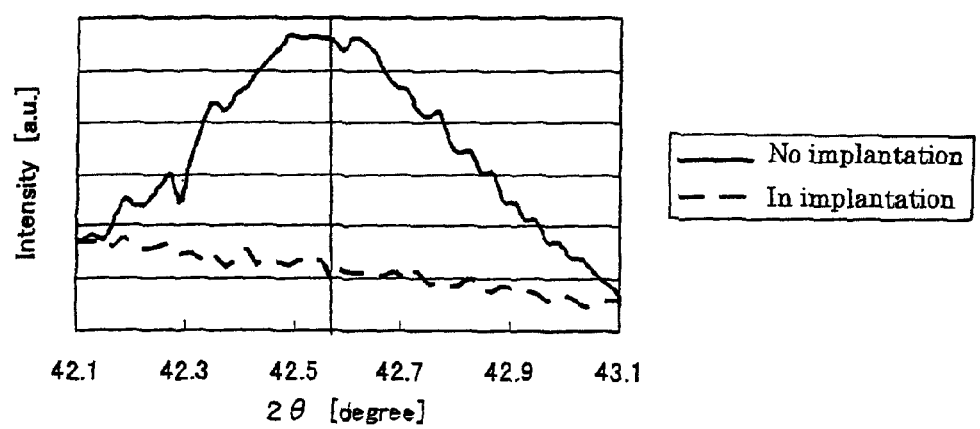
FIG. 3 is a graph depicting the decrease of Co (002) or Co (110) peak in the X-ray diffraction in consequence of the implantation of In atoms into a magnetic layer.

On the glass substrate, a soft magnetic layer of FeCoB, an intermediate layer of Ru and a magnetic layer of an 70Co-5Cr-15Pt-10SiO$_2$ alloy were stacked by the DC spluttering method and a protecting film layer of C (carbon) and a fluorine-based lubricating film were further stacked by the P-CVD method, sequentially in the order mentioned. The FeCoB soft magnetic layer had a film thickness of 600 Å, the Ru intermediate layer 100 Å, the magnetic layer 150 Å and the C (carbon) protecting film layer an average of 4 nm respectively. Thereafter, a magnetic pattern was formed by a magnetic layer processing treatment. Specifically, a magnetic recording medium was produced by applying a resist of a thermosetting resin as a coating and forming concaves and convexes in conformity with a prescribed pattern, subsequently forming a magnetic pattern designed in conformity with the distance between the tracks in the magnetic layer by causing preferably the atoms of any one or more elements selected from the group consisting of B, P, Si, F, N, H, C, In, Bi, Kr, Ar, As, Ge, Mo and Sn, more preferably the atoms of any one or more elements selected from the group consisting of B, P, Si, F, N, H and C or the atoms of any one or more elements selected from the group consisting of Si, In, Ge, Bi, Kr, Xe and W, and most preferably the atoms of Si or Kr to be driven into the magnetic layer by the ion beam method, removing the resist and the protecting film, then re-forming a protecting layer in a thickness of 4 nm and applying a lubricating material as a coating. The samples obtained consequently were labeled Examples 1 to 26. Incidentally, the conditions, such as the amounts of implantation by ion beam and the accelerated voltages involved in the production were as shown in Table 1 below. The conditions concerning the amount of implantation by ion beam and the accelerated voltage were required to be set in advance by a preliminary experiment. When the Co (002) or CO (110) peak strength of the magnetic layer determined by the X-ray diffraction was required to be ½ or less, for example, the diffraction peak of the magnetic layer due to the implantation of atoms was made to assume such a state as indicated by a broken line in FIG. 3, wherein a solid line represents the state of the magnetic layer assumed prior to the implantation of atoms. Also, the conditions for unmagnetizing the magnetic layer and the conditions for rendering the magnetic layer amorphous were required to be set in advance by the determination of X-ray diffraction, the determination of electron diffraction or the like.

Comparative Examples 3 and 4

Magnetic recording media were produced under the same conditions as in Example 1, excepting N and O atoms were used for ion implantation.

Comparative Examples 5 to 7

Magnetic recording media were produced under the same conditions as in Example 1, provided that Si atoms were used for ion implantation and the amounts of implantation and the accelerated voltages used herein were lower than those of Examples 1 and 2.

Comparative Example 8

A magnetic recording medium was produced under the same conditions as in Example 1, provided that no ion implantation was effected. It was an ordinary magnetic recording medium that resulted from implanting atoms into a magnetic layer already deposited as a coating and keeping the magnetic layer from being partially unmagnetized.

The samples of Examples 1 to 26 and Comparative Examples 1 to 8 were evaluated for electromagnetic conversion property with a spin stand. In the evaluation, a perpendicular recording head was used for recording and a TuMR head was used for reading. The samples, after recording a signal of 750 kFCI, were tested for SNR and 3T-squash. It was consequently found that the samples of Examples 1 to 26 were greatly improved in RW properties, such as SNR and 3T-squash, over the samples of Comparative Examples 1 to 8. It is inferred that this improvement resulted from stabilizing the head floatation property and consequently enabling RW to proceed at a prescribed height of floatation and further from completely eliminating the state of magnetization of the regions between the magnetic tracks. On account of the confirmation of the RW properties, such as SNR and ST-squash, it was also confirmed that the samples of Examples 1 to 26 allowed distinct separation of the adjacent tracks with a nonmagnetic part and as well, in consequence of the ion implantation with the ion beam, enabled a magnetic pattern comprising magnetic parts and nonmagnetic parts to be formed in the magnetic layer part thereof in conformity with a resist pattern in the prescribed concavoconvex shape.

After completion of the determination of the electromagnetic conversion property, the samples of Examples 1 to 26 and Comparative Examples 1 to 8 were tested for surface roughness by the use of an AFM. The nonmagnetic substrates produced in the Examples and the Comparative Examples for use in a vertical recording medium were evaluated for roughness (Ra) in a visual field of 10 μm with an AFM made by Digital Instruments Corp. The evaluation used a resolution of 256×256 tapping mode and a sweep rate of 1 μm/second. The results of the evaluation are shown in Table 1 below. The samples of Examples 1 to 26 showed markedly low magnitudes of surface roughness as compared with the samples of Comparative Examples 1 and 2. It is inferred that this improvement resulted in stabilizing the head floatation.

The samples of Examples 1 to 26 and Comparative Examples 1 to 8 were evaluated for glide avalanche. The evaluation was performed in a device made by Sony/Tektronix Corp. and sold under the product code of "DS4100" by the use of a 50% slider head made by Gliderite Hardware Co. The results of the evaluation are shown in Table 1 below. It is clear that Examples 1 to 26 excelled Comparative Examples 1 and 2 in head-floating property because of low glide avalanche.

TABLE 1

| | Ions implanted | Amount of ions implanted (atom/cm$^2$) | Accelerated voltage (keV) | SNR (dB) | 3T-squash (%) | Ra (nm) | Glide Avalanche (nm) | Ratio of Co (002) peak strength (vs. Comp. Ex. 8) in implanted part | Presence of amorphous property in nonmagnetic part |
|---|---|---|---|---|---|---|---|---|---|
| Ex. 1 | Si | 5 × e15 | 35 | 12.6 | 70.1 | 0.6 | 5.6 | 0.5 | Yes |
| Ex. 2 | Si | 5 × e16 | 35 | 13.5 | 86.7 | 0.7 | 6.0 | 0.0 | Yes |
| Ex. 3 | B | 5 × e16 | 10 | 12.7 | 72.0 | 0.3 | 5.8 | 0.5 | Yes |
| Ex. 4 | F | 5 × e16 | 15 | 12.6 | 72.1 | 0.9 | 6.8 | 0.4 | Yes |
| Ex. 5 | P | 5 × e16 | 30 | 12.9 | 81.1 | 0.7 | 6.1 | 0.0 | Yes |
| Ex. 6 | W | 5 × e16 | 60 | 12.5 | 79.8 | 0.4 | 5.2 | 0.0 | Yes |
| Ex. 7 | C | 5 × e16 | 12 | 12.3 | 81.3 | 0.6 | 6.1 | 0.0 | Yes |
| Ex. 8 | In | 5 × e16 | 45 | 13.2 | 87.3 | 0.7 | 6.2 | 0.0 | Yes |
| Ex. 9 | Ge | 5 × e16 | 45 | 12.9 | 85.4 | 0.7 | 6.6 | 0.0 | Yes |
| Ex. 10 | Bi | 5 × e16 | 35 | 12.5 | 84.2 | 0.7 | 6.0 | 0.0 | Yes |
| Ex. 11 | Kr | 5 × e16 | 40 | 13.1 | 87.7 | 0.6 | 5.9 | 0.0 | Yes |
| Ex. 12 | Ar | 5 × e16 | 30 | 12.3 | 84.2 | 0.6 | 6.1 | 0.0 | Yes |
| Ex. 13 | B, F | B: 5 × e16 F: 5 × e16 | B: 10 F: 15 | 12.1 | 78.5 | 0.5 | 5.5 | 0.0 | Yes |
| Ex. 14 | Si, F | Si: 5 × e16 F: 5 × e15 | Si: 35 F: 15 | 13.1 | 82.1 | 0.4 | 5.6 | 0.0 | Yes |
| Ex. 15 | W, F | W: 5 × e16 F: 5 × e15 | W: 60 F: 60 | 12.9 | 81.7 | 0.7 | 6.5 | 0.0 | Yes |
| Ex. 16 | Si, P | Si: 5 × e16 P: 5 × e15 | Si: 35 P: 30 | 12.5 | 83.2 | 1.3 | 7.4 | 0.0 | Yes |
| Ex. 17 | P, H | P: 5 × e16 H: 5 × e15 | P: 30 H: 5 | 11.6 | 78.4 | 1.8 | 7.8 | 0.0 | Yes |
| Ex. 18 | Si, H | Si: 5 × e16 H: 5 × e15 | Si: 35 H: 5 | 11.3 | 79.4 | 1.5 | 7.5 | 0.0 | Yes |
| Ex. 19 | C, F | C: 5 × e16 F: 5 × e15 | C: 12 F: 15 | 11.5 | 79.9 | 1.2 | 7.3 | 0.0 | Yes |
| Ex. 20 | In, F | In: 5 × e15 F: 5 × e15 | In: 35 F: 15 | 13.1 | 87.6 | 0.8 | 5.9 | 0.0 | Yes |
| Ex. 21 | Ge, H | Ge: 5 × e15 H: 5 × e15 | Ge: 35 H: 15 | 12.6 | 85.4 | 0.8 | 6.5 | 0.0 | Yes |
| Ex. 22 | As | 1 × e16 | 35 | 13.5 | 86.7 | 0.6 | 5.6 | 0.0 | Yes |
| Ex. 23 | Xe | 5 × e16 | 35 | 12.3 | 85.3 | 0.9 | 6.3 | 0.0 | Yes |
| Ex. 24 | Bi | 1 × e16 | 40 | 13.1 | 85.3 | 0.6 | 5.7 | 0.0 | Yes |
| Ex. 25 | Mo | 1 × e16 | 35 | 12.9 | 83.2 | 0.5 | 6.5 | 0.0 | Yes |
| Ex. 26 | Sn | 1 × e16 | 35 | 12.7 | 83.7 | 0.6 | 6.3 | 0.0 | Yes |
| Comp. Ex. 1 | None | — | | 6.5 | 54.3 | 10.0 | 13.4 | — | — |
| Comp. Ex. 2 | None | — | | 10.1 | 64.9 | 2.8 | 10.0 | — | — |
| Comp. Ex. 3 | O | 5 × e16 | 15 | 12.1 | 59.5 | 0.6 | 6.2 | 1.0 | No |
| Comp. Ex. 4 | N | 5 × e16 | 15 | 12.1 | 59.9 | 0.6 | 6.2 | 0.9 | No |
| Comp. Ex. 5 | Si | 5 × e12 | 35 | 11.5 | 60.3 | 0.5 | 6.0 | 1.0 | No |
| Comp. Ex. 6 | Si | 5 × e13 | 35 | 12.3 | 60.4 | 0.6 | 5.3 | 1.0 | No |
| Comp. Ex. 7 | Si | 5 × e14 | 35 | 12.2 | 63.1 | 0.6 | 6.2 | 0.9 | No |
| Comp. Ex. 8 | None | — | | 12.1 | 59.4 | 0.5 | 5.5 | 1.0 | — |

The comparison of Examples 1 to 26 with Comparative Examples 1 to 8 has made it clear that this invention enables convenient production of a discrete medium exhibiting sufficiently low surface roughness and producing stable head floatation by the technique of unmagnetizing the magnetic layer due to ion implantation. As is clear from this comparison of the Examples and the Comparative Examples, the production so implemented as to lower the surface roughness to the fullest possible extent constitutes an important factor for the sake of stabilizing the head floatation. This invention prefers to fix surface roughness Ra at $0.2 \leqq Ra \leqq 2$ nm and more favorably at $0.2 \leqq Ra \leqq 1.5$ nm. It is evident that this invention serves as an effective means for separating patterned nonmagnetic and magnetic layers and further for producing a patterned medium aimed at still higher recording density than the discrete method.

INDUSTRIAL APPLICABILITY

It is possible to provide a magnetic recording medium that ensures retention of the stability of head floatation, possesses an excellent ability to separate a magnetic recording pattern, avoids succumbing to the influence of signal interference between the adjacent pattern parts and excels in a high recording density property. Therefore, the present invention contributes greatly to the enhancement of the productivity of magnetic recording media.

The invention claimed is:

1. A method for the production of a magnetic recording medium comprising the steps of depositing a Co-containing magnetic layer on at least one side of a nonmagnetic substrate and partially implanting atoms into the Co-containing magnetic layer to partially unmagnetize the Co-containing magnetic layer, thereby forming nonmagnetic parts and a magnetic recording pattern magnetically separated by the nonmagnetic parts and lowering Co (002) or Co (110) peak strength of a relevant part of the Co-containing magnetic layer as determined by the X-ray diffraction to ½ or less of the peak intensity of the magnetic layer before implantation of atoms.

2. A method according to claim 1, wherein the atoms to be implanted are atoms of Si.

3. A method according to claim 2, wherein the atoms to be implanted further comprise any one or more selected magnetically from the group consisting of B, P, F, H and C.

4. A method according to claim 2, wherein the atoms to be implanted further comprise any one or more selected magnetically from the group consisting of P, F and H.

5. A method according to claim 2, wherein the atoms to be implanted further comprise any one or more selected magnetically from the group consisting of In, Bi and W.

* * * * *